FIG. I
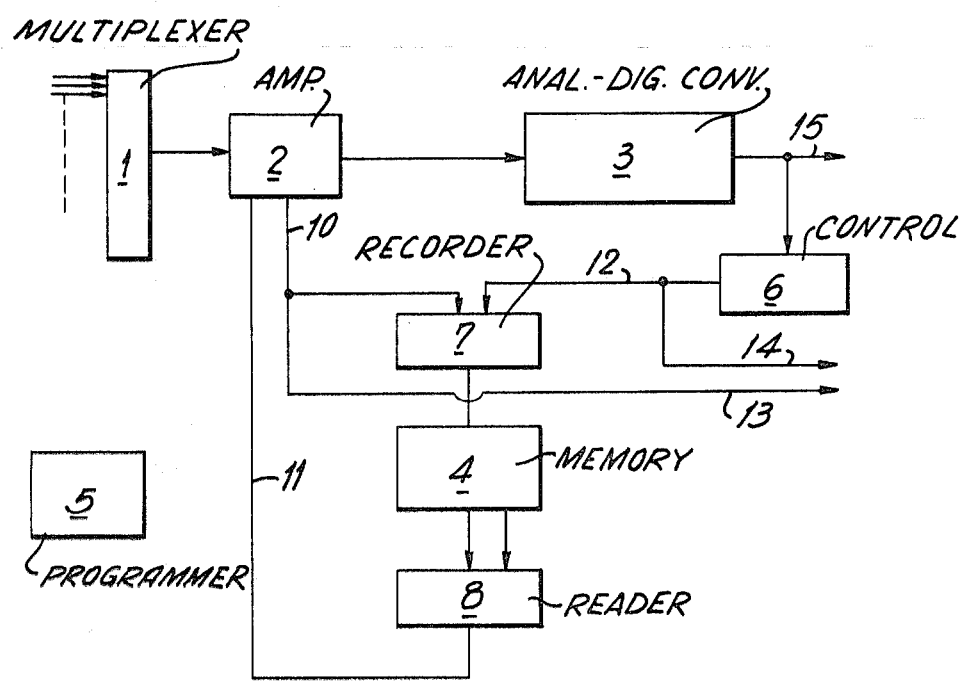
FIG. 2
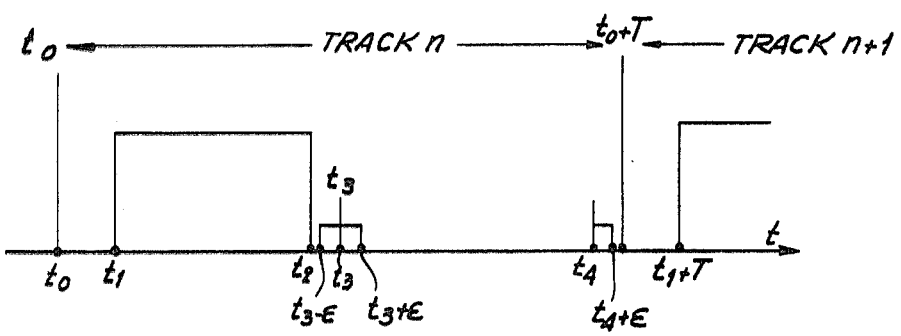

United States Patent Office 3,559,180
Patented Jan. 26, 1971

3,559,180
ELECTRONIC MEASURING APPARATUS
Christian Georges Joly, Nantes, France, assignor, by mesne assignments, to Compagnie Generale de Geophysique, Paris, and L'Institut Francais du Petrole, des Carburants et Lubrifiants, Rueil-Malmaison, France
Filed Nov. 3, 1967, Ser. No. 680,514
Claims priority, application France, Mar. 13, 1967, 98,449
Int. Cl. G06f 9/18; G01v 1/00
U.S. Cl. 340—172.5                                 6 Claims

ABSTRACT OF THE DISCLOSURE

A circuit wherein an analog-to-digital converter is fed by an amplifier coupled to a multiplexer receiving measured magnitudes from a number of tracks, said amplifier being provided with a numerical gain control and being associated with a memory supplying, for each track and once during each successive cycle, the desired corrected gain to be assumed by the amplifier for the sample of the measurement fed by the multiplexer out of the corresponding track. This arrangement allows in particular measuring and recording in quick succession the voltages received by a large number of measuring devices, for instance for seismic prospecting purposes, to provide signals which it is essential to amplify and which are to be measured without saturation, even in the case of highly dynamic signals, the operation being performed in the vicinity of the maximum capacity of the computer so as to increase its accuracy.

DRAWING

FIG. 1 is a block diagram of a circuit in accordance with said embodiment; and
FIG. 2 is a signal chart.

DETAILED DESCRIPTION

In various applications and more particularly for seismic prospecting purposes, it is now a conventional matter to resort to amplifiers the gain of which does not vary continuously but by a predetermined number of discrete steps, each step corresponding to a well-defined value of the gain. It is possible to use, for instance, amplifiers of which the gain is adapted to vary at the rate 2, 4, 8, etc., in which case the amplifier is known as an amplifier with a binary gain control.

It is, furthermore, more and more usual to express the results of measurements numerically, for instance in accordance with the binary code; in other words, a characteristic figure is caused to correspond to each value measured at a predetermined moment.

Lastly, there are various schemes of experiments and tests which have developed, for instance for seismic prospecting purposes, in which it is necessary to measure and record numerically and very speedily the voltages produced by a large number of measuring apparatus, for instance thirty apparatus corresponding to thirty tracks.

In order to cut out the necessity of resorting to as many series of apparatus as there are tracks, which would be prohibitive in the case considered, the advantageous possibilities of multiplexing provided by electronic apparatus have been resorted to as is well known in the art.

As a matter of fact, such multiplexing contrivances make it possible to sample and to measure in succession the voltages in the different tracks during a cycle the duration of which may be small with reference to the total duration of execution of the measurements. It is also known, on the other hand, that the voltage in each track should vary at a sufficiently low rate for the sampling at any given moment of each cycle to supply reliable results.

Experience shows furthermore that it is necessary to amplify the voltages supplied by the measuring apparatus since the values of said voltages are in practice too low for them to be fed into the input of a conventional analog-to-digital converter.

There are two possible methods for the connection of the amplifiers, to wit:
One amplifier may be inserted in each track ahead of the multiplexing means.
Or else a single amplifier may be used and inserted following the multiplexing means.

The insertion of as many amplifiers as there are tracks, which amplifiers may for instance be of the binary gain control type, leads to a very large system or apparatus under poor conditions of efficiency since each amplifier operates only during a very short fraction of the cycle. Furthermore, the balancing between the amplifiers for each value of their gain requires an extremely lengthy and different adjustment, which adjustment furthermore lacks stability with reference to the time in a manner which is not consistent with the accuracy which is normally required for numerical systems.

On the other hand, the use of a single sampling amplifier beyond the multiplexing means required hitherto the use of conventional gain control means having consequently a comparatively large time constant, whereby a common value of the gain was imparted to all of the tracks. Furthermore, the variation of the gain was not linear and did not appear in a numerically workable manner.

The invention has as an object the provision of an arrangement of the above-disclosed type which allows inserting a single amplifier following the multiplexing means, while insuring a control of the gain in each track independently of the gain in all the other tracks.

Said result is obtained, in accordance with the invention, by the use of an amplifier provided with a numerical control of its gain, such as an amplifier provided with a binary gain control for instance, and associated with a memory which is readily accessible and supplies when requested the gain which the amplifier is to provide for each of the multiplexed tracks.

The invention thus employs an amplifier with a numerical control of the gain, generally a binary gain control, which amplifier is inserted between the multiplexing means and the analog-to-digital converter. There is thus obtained a multiplexed sampling amplifier provided with a numerical gain control.

In the case of a very high multiplexing rate, the use of several amplifiers of the above-mentioned type operating each in its turn lies within the scope of the invention. Such an arrangement has in fact no further purpose than to lengthen the duration of the idle periods separating the aspmpling executed in the different tracks.

The modifying of the gain of an amplifier causes transient phenomena to arise in its different stages. It is therefore a difficult matter to make the instantaneous gain pass from the value required for a given track to the value required for the next track. A minimum damping period is therefore necessary between the successive sampling operations. This may be obtained, for an increased multiplexing rate, by reducing the number of tracks connected to the same amplifier. A further multiplexing is then required for feeding a single analog-to-digital converter.

It is a well known fact that, in such arrangements, the ratio between the extreme values of the amplitudes which may be correctly transcribed by the analog-to-digital converter is clearly smaller than the ratio between the extreme values which may be assumed by the voltages to be measured. Consequently, it is necessary for the gain of the amplifier supplying the samples corresponding to the different tracks to vary as a function of the value of the voltage measured. This is the reason for which amplifiers with a variable gain should be inserted between the measuring apparatus and the converter.

The invention is next described in greater detail, reference being made to the accompanying drawing showing by way of example and in a non-limiting sense an embodiment of the invention.

In the synoptic diagram of FIG. 1 showing the different means inserted between the multiplexing means and the converter forming part of a measuring and numerical recording system, the latter includes by way of example thirty tracks.

FIG. 2 illustrates the time progression of the different operations chiefly as concerns the amplifier provided with a numerical gain control.

FIG. 1 shows a multiplexing means or synchronous distributor 1 fed by thirty measuring tracks in parallel and supplying thirty samples to an amplifier 2 which includes a numerical binary gain control. The samples amplified at the desired moments are then fed into the input of the analog-to-digital converter or coder 3.

The gains corresponding to the different tracks are recorded in a memory 4 out of which they are extracted when required.

The system of means 1, 2, 3, 4 is controlled by a suitable programmer 5 having connections (not illustrated) with each of these means.

The control means 6 receives the output of the coder 3 and transmits suitable orders for providing the required gain control in each track for the next cycle, said orders being dependent on the results of the coding executed during the preceding cycles and during the cycle which is being in course of execution.

The value of the gain in each of the thirty tracks is fixed during each cycle, but with independent values for each track. These values may be entirely different from one another. Examination of the procedure in one of the tracks will be sufficient for understanding the operation.

Immediately after amplification of a sample, the gain corresponding to the track considered is sent upon an order given out by the programmer 5 to the recording means 7 through the line 10. The value of the gain is then fed into the memory 4 from which is thereafter extracted the value of the gain corresponding to the next track, together with the correction to be made (if any is required) of its value. This extraction is performed by the reading means 8 which insures simultaneously the reading and the execution of the correction which may be required, after which it feeds the result obtained into the amplifier 2 via line 11. The result of the coding appears in the arrangement only at the end of the sampling of the track considered and consequently the order produced by the control means 6 and relating to the gain enters the memory only at the end of the operation, through the agency of the recording means 7 and the line 12.

As a matter of fact and in accordance with an important object of the invention, experience shows that the best manner of insuring satisfactory operation of the arrangement consists of recording the gain immediately as applied and to feed only afterwards into the memory 4 the correction supplied by the control means 6. The time interval separating the entry of the two values of said gain and correction into the memory may be resorted to with a view to cutting out the transient phenomena following the introduction of the next gain, which is performed immediately after the entry of the first of said values into the memory.

Lines 13 and 14 allow tapping off the values of the gains and of the associated corrections during the transfer of said values with a view to recording them on a magnetic tape.

The result of the coding supplied by the coder 3 is also recorded through the agency of line 15 and forms the mantissa of the numerical value defining the sample considered. Line 13 supplies the associated characteristic. In the case of an amplifier provided with a binary gain control, the system constituted by the two informations, the characteristic and the mantissa form an illustration of the sample with a floating point.

Turning to the time chart of FIG. 2 which shows the manner of using the amplifier, the distributor 1 connects the track $n$ with the amplifier 2 at the moment $t0$.

The analog-to-digital converter includes, at its input, means which may be termed the sampling and locking means receiving the voltage fed by amplifier 2 at the moment $t1$. At a moment slightly before $t2$, its internal memory constituted by a condenser marks, with a very high accuracy, the value assumed at the output of the amplifier 2 and finally at the moment $t2$ the connection with said amplifier 2 is cut off and the sampling and locking means maintain the level which has thus entered its memory, up to the moment $t1+T$, T being the sampling period.

Immediately after the moment $t2$, the gain corresponding to the track $n$, which is no longer useful, is re-introduced into the memory 4 at a moment comprised between $t3$ and $t3-\epsilon$ after which the gain associated with the next track $(n+1)$ which it is now necessary to use is introduced at a moment comprised between $t3$ and $t3+\epsilon$ into the amplifer 2, simultaneously if required with a correction at a moment between $t3$ and $t3+\epsilon$. Consequently, the transient phenomena corresponding to the change of gain can fade away between the moments $t3$ and $t0+T$, whereas the parasitic multiplexing phenomena between the track $n$ and the track $n+1$ disappear between $t0+T$ and $t1+T$.

It will be lastly remarked that the result of the sampling of the track $n$ arrives at $t4$ and is immediately dealt with by the control means 6 of which the order enters the memory in registry with a point corresponding to the track $n$ at a moment between $t4$ and $t4+\epsilon$.

It should be remarked that the programmer 5 serves also as a time distributing means; the duration $(t2-t1)$ is of a magnitude of 10 microseconds, whereas T is of a magnitude of the order of 30 microseconds and $\epsilon$ approximates 1 microsecond.

What is claimed is:

1. In a measuring instrument including an analog-to-digital converter and a multiplexer adapted to sample a plurality of tracks and convey measured magnitudes to said analog-to-digital converter, the combination of an amplifier connected to said converter and coupled to said multiplexer and cyclically fed samples from said plurality of tracks by the multiplexer, numerical gain control means for said amplifier, a memory operatively coupled with said amplifier and adapted to store the gains for the successive tracks and including means defining corrections to be made to the gain in each track during the cycle following the cycle which is being executed, and control means operatively connecting the converter with the memory.

2. In the combination claimed in claim 1, means connected to said converter, said amplifier and said means defining corrections for recording the gains, said corrections and the output of said converter.

3. Apparatus comprising multiplexer means adapted to sample sequentially and in a cycle a plurality of available input signals, an amplifier for amplifying the sampled signals and including a numerical gain control, analog-to-digital converter means to encode the thusly amplified signals, control means responsive to said converter means to generate gain correction signals for a subsequent cycle, memory means coupled to said control means and amplifier to remember the gain and the gain correction signals, and reading means to extract signals from the memory means to control the amplifier for each sampled input signal.

4. Apparatus as claimed in claim 3, wherein the gain control is a binary gain control.

5. A measuring instrument comprising a multiplexer unit adapted to sample a plurality of tracks, a variable gain amplifier having an input connected to an output of said multiplexer unit, an analog-to-digital converter having an input connected with an output to said amplifier, numerical gain control means to control the gain of said amplifier, memory means operatively connected with the amplifier and adapted to store the gains for the successive tracks and to actuate said numerical gain control means, and means defining corrections to be made to the gain in each track during the cycle following the cycle which is being executed, said means defining corrections being actuated by said converter, and actuating said memory means, the digital data at the output of the measuring instrument comprising a digital character provided by said converter in relation with the output signal of said amplifier, and a digital character representative of the selected numerical gain.

6. A measuring instrument as claimed in claim 5 comprising recording means connected to said converter, to said means defining corrections and to said amplifier, to record respectively the digital character in relation with the output signal of said amplifier, the corrections and the digital character representative of the selected numerical gain.

References Cited

UNITED STATES PATENTS

| | | | |
|---|---|---|---|
| 3,333,247 | 7/1967 | Hadley et al. | 340—172.5 |
| 3,340,499 | 9/1967 | Hadley | 340—15.5 |
| 3,376,557 | 4/1968 | Godinez | 340—172.5 |

RAULFE B. ZACHE, Primary Examiner

U.S. Cl. X.R.

340—15.5